(12) United States Patent
Kasazumi et al.

(10) Patent No.: US 7,866,831 B2
(45) Date of Patent: Jan. 11, 2011

(54) IMAGE PROJECTOR

(75) Inventors: Ken'ichi Kasazumi, Osaka (JP);
Yoshikazu Hori, Tokyo (JP)

(73) Assignee: Panasonic Corporation, Osaka (JP)

( * ) Notice: Subject to any disclaimer, the term of this patent is extended or adjusted under 35 U.S.C. 154(b) by 574 days.

(21) Appl. No.: 11/886,155

(22) PCT Filed: Mar. 13, 2006

(86) PCT No.: PCT/JP2006/304917
§ 371 (c)(1),
(2), (4) Date: Sep. 12, 2007

(87) PCT Pub. No.: WO2006/098281
PCT Pub. Date: Sep. 21, 2006

(65) Prior Publication Data
US 2008/0198334 A1 Aug. 21, 2008

(30) Foreign Application Priority Data
Mar. 16, 2005 (JP) ............... 2005-074594

(51) Int. Cl.
*G03B 21/28* (2006.01)
(52) U.S. Cl. .............. 353/98; 353/46; 353/48; 353/50; 353/119; 359/196.1; 359/197.1; 359/198.1; 359/199.1; 359/199.4; 359/599; 359/600; 359/601; 359/838; 372/15; 372/24
(58) Field of Classification Search ......... 353/31, 353/98, 46, 48, 49, 50, 119; 359/707, 622, 359/634, 196.1, 197.1, 198.1, 199.1, 199.4, 359/838, 599, 600, 601; 372/108, 15, 24; 349/112, 113
See application file for complete search history.

(56) References Cited

U.S. PATENT DOCUMENTS

| 4,155,630 A | 5/1979 | Ih |
| 5,313,479 A | 5/1994 | Florence |

(Continued)

FOREIGN PATENT DOCUMENTS

| CN | 1311863 | 9/2001 |

(Continued)

OTHER PUBLICATIONS

Chinese Office Action issued Feb. 13, 2009 in the Chinese Application No. 200680008321.X (along with English translation).

(Continued)

*Primary Examiner*—Georgia Y Epps
*Assistant Examiner*—Sultan Chowdhury
(74) *Attorney, Agent, or Firm*—Wenderoth, Lind & Ponack, L.L.P.

(57) ABSTRACT

An image projector realizing image projection with high image quality by reducing speckle noise. An image projector comprising a coherent light source, a collimation lens for transforming coherent light emitted from the coherent light source into coherent parallel light, and a projection optical system for projecting coherent parallel light is further provided with a reflection element for reflecting the coherent parallel light and capable of oscillating in parallel with the direction normal to the reflection plane, and a reflection element drive means for causing oscillatory motion of the reflection element.

2 Claims, 6 Drawing Sheets

U.S. PATENT DOCUMENTS

| | | | |
|---|---|---|---|
| 6,317,169 | B1 | 11/2001 | Smith |
| 6,535,337 | B1 | 3/2003 | Tanaka et al. |
| 6,594,090 | B2 * | 7/2003 | Kruschwitz et al. ......... 359/707 |
| 7,643,524 | B2 * | 1/2010 | Mizuuchi et al. ......... 372/38.05 |
| 2006/0227293 | A1 * | 10/2006 | Kasazumi et al. ............. 353/30 |
| 2007/0120983 | A1 * | 5/2007 | Yamamoto et al. ..... 348/208.99 |

FOREIGN PATENT DOCUMENTS

| | | |
|---|---|---|
| CN | 1354842 | 6/2002 |
| JP | 63-100461 | 5/1988 |
| JP | 6-208089 | 7/1994 |
| JP | 7-297111 | 11/1995 |
| JP | 2002-543455 | 12/2002 |
| JP | 2003-186112 | 7/2003 |
| JP | 2004-311897 | 11/2004 |

OTHER PUBLICATIONS

International Search Report of Apr. 18, 2006 issued in International Application No. PCT/JP2006/304917.

Chinese Office Action (along with English translation) issued Jul. 31, 2009 in Chinese Application No. 200680008321.X.

English translation of the International Preliminary Report on Patentability issued Sep. 18, 2007 in PCT/JP2006/304917.

* cited by examiner

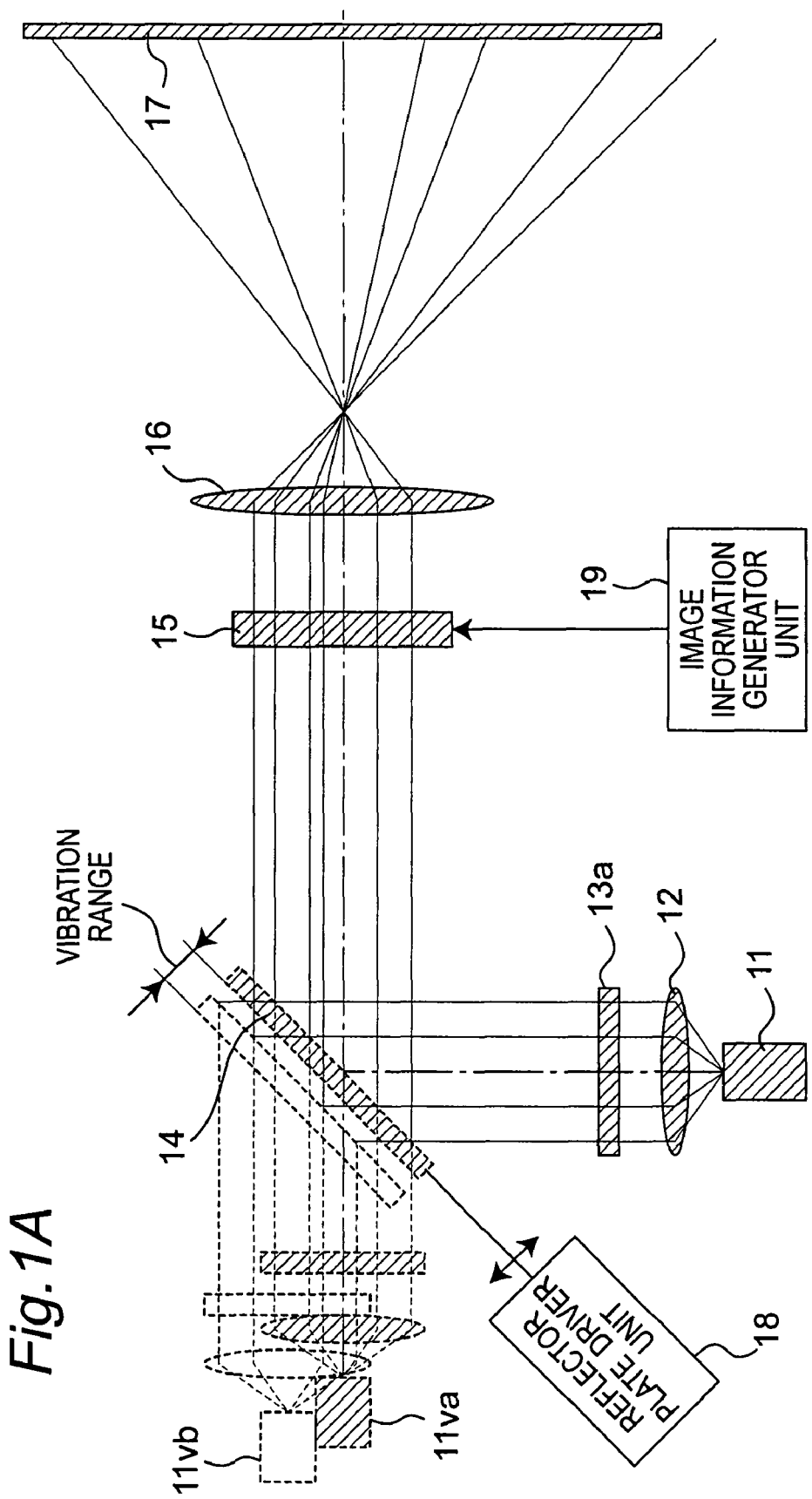

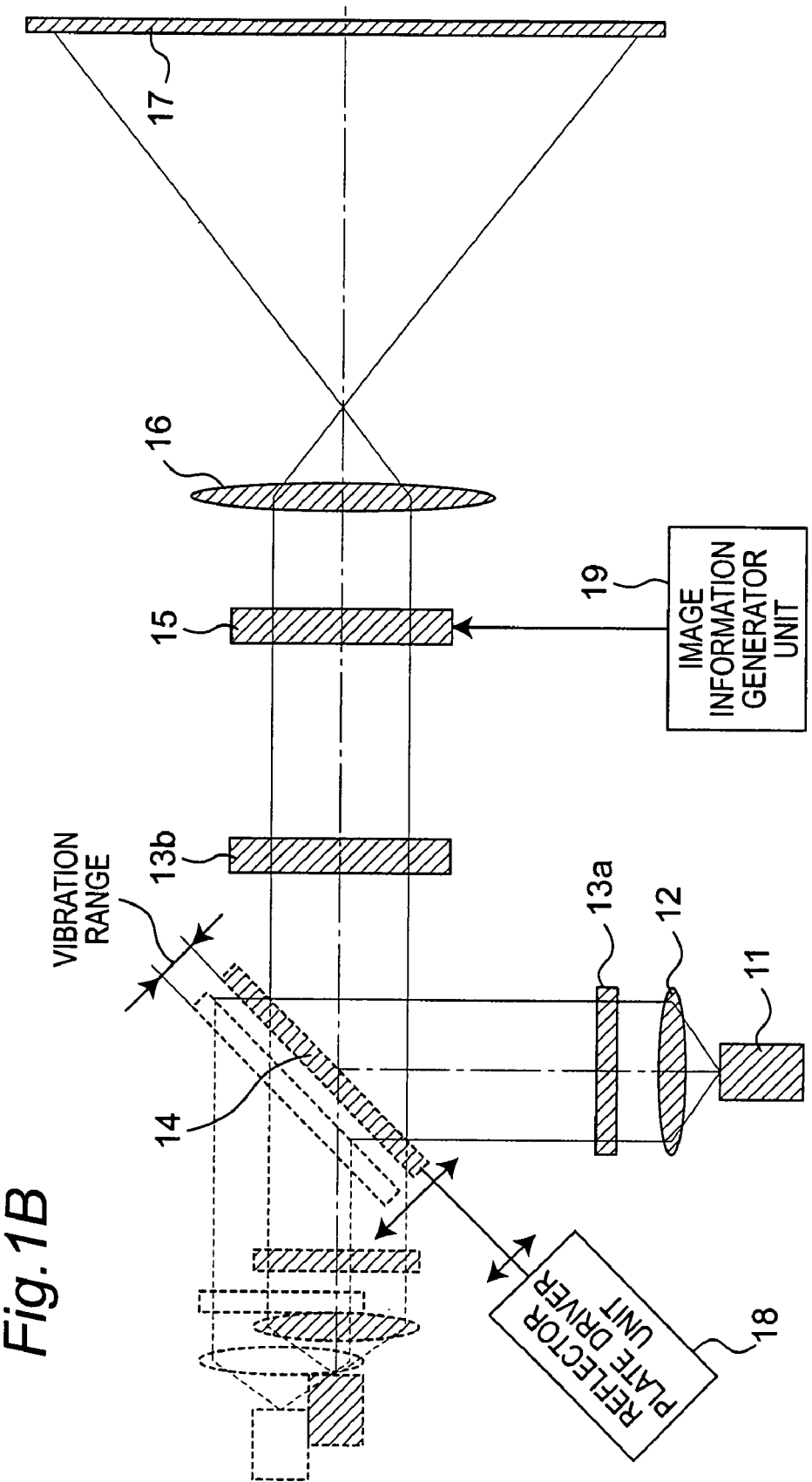

IMAGE PROJECTOR

TECHNICAL FIELD

The present invention relates to an image projector or a visual display such as a television receiver, an image projector, and a semiconductor exposure apparatus, and more particularly, to an image projector using a coherent light source as a light source.

BACKGROUND ART

In recent years, an image projector using a metal halide lamp, halogen lamp, Xenon arc lamp, high-pressure mercury discharge lamp, or the like (referred to as "a lamp or the like," hereinafter,) as a light source have become common. For the image projector of this type, output light from the lamp or the like being used as a light source is separated into red light (long-wavelength light), green light (intermediate-wavelength light), and blue light (short-wavelength light) by means of a wavelength selective mirror. Each separated light of such colors is modulated separately by a liquid crystal panel. Then, the separated and modulated light is multiplexed by a dichroic prism and projected onto a screen by a projector lens. This emerges a color image on the screen.

It is unfortunate, however, that the above said lamp or the like has relatively short lifetime. Hence, when the above said lamp or the like is used as a light source, it is a hassle to maintain the light source. In addition, three primary colors are created by separating white light from above said lamp or the like by means of above mentioned method. So it complicates an optical system of the projector. Owing to the optical property of the wave selective mirror, the light separated by the wave selective mirror exhibits relatively broad spectrum width. Accordingly, the color reproduction region of the projector is confined within a restricted narrow area and, hence, it is difficult to deliver a vivid pure color. Moreover, the image projector of this type has an issue of low light use efficiency.

In order to overcome such issues from which the image projector using the above lamp or the like suffers, many trials in which a laser light source has been used as a light source have been gone through in recent years. A laser light source operates longer than conventional white light sources and have high energy efficiency, and, in addition, is advantageous in terms of light use efficiency due to its excellent directivity of laser light. Furthermore, good monochromaticity of laser light may make a color reproduction region of the image projector wider than that of the above said type of image projector.

When the laser light source is used in the image projector as described above, however, there is a problem that inherent coherency (nature of being prone to interfere) of laser light causes speckle noise to be found in an image and, as a consequence, it deteriorates the picture quality of the projected image. The term speckle noise here includes a phenomenon wherein granulated intensity distribution of light is found on a viewing plane. The light is a bundle of coherent light from the laser light source and is scattered at several locations on an object surface. On the viewing plane, a wavefront of the coherent light having scattered at a certain location of the object surface and another wavefront of the coherent light having scattered at another location nearby the above said certain location interfere with each other. As a consequence, the granulated intensity distribution is found on the viewing plane. For practical use of the image projector that uses a laser as a light source, there still remains the serious problem of reducing the generation of the speckle noise.

So as to suppress the speckle noise, the exposure illumination apparatus of JP07-297111-A (Patent Document 1) that uses laser light includes a diffuser plate that can rotate in its optical system such that the diffuser plate may turn coherent light into incoherent light, for example.

Moreover, the projection display apparatus of JP06-208089 (Patent Document 2) that uses laser light includes a movable diffuser plate (that can rotate and/or vibrate etc.) in its optical system such that the diffuser plate may turn coherent light into incoherent light.

[Patent Document 1] JP 07-297111-A

[Patent Document 2] JP 06-208089-A

DISCLOSURE OF INVENTION

Problem to be Solved by the Invention

However, when using such rotatable diffuser plates for diffusing coherent light, the diffuser plate includes a diffusing area which does not contribute to the diffusion of the coherent light at any moment of operation. Taking the opposite view, a diffuser plate having large diffusing area including an area not being necessary for diffusing the coherent light is used. As a consequence, it gives rise to a problem that the optical system of the apparatus should become large improperly.

It is an object of this invention to provide an image projector which achieves an excellent picture quality by suppressing the generation of the speckle noise.

Particularly, it is an object of this invention to an image projector that has a simplified optical system configuration being simpler than those of the conventional ones.

Means for Solving Problem

In one aspect of the present invention, an image projector includes: a coherent light source; a collimator lens that collimates coherent light from the coherent light source to form collimated coherent light; a projector optical system that projects the collimated coherent light; a reflector element that reflects the collimated coherent light and is capable of vibrating in parallel with a direction normal to a reflector surface of said reflector element; and a reflector element driver unit that drives the reflector element in vibrating motion.

In the aspect of the present invention, this invention preferably further includes a first diffuser element that diffuses the collimated coherent light, the first diffuser element is disposed on an optical path of the collimated coherent light between the collimator lens and the reflector element.

In the aspect of the present invention, this invention preferably further includes a first diffuser element that diffuses the collimated coherent light, the first diffuser element is formed on the reflector surface of the reflector element.

In the aspect of the present invention, this invention preferably further includes a second diffuser element that diffuses light, the second diffuser element is disposed on an optical path of the collimated coherent light between the reflector element and the projector optical system.

In the aspect of the present invention, the first diffuser element and the second diffuser element are preferably a single diffuser element that is laminated above the reflector surface of the reflector element.

In the aspect of the present invention, the reflector element driver unit preferably drives the reflector element in reciprocatory vibrating motion in a normal direction of a principal surface of the reflector element.

In the aspect of the present invention, the reflector element driver unit preferably drives the reflector element in rotational vibrating motion about a central axis of the rotation which is in a plane parallel with a principal surface of the reflector element.

In the aspect of the present invention, a vibration range of the reflector element is preferably more than or equal to square root of 2 times of a maximum period of concavity and convexity profile which is formed on a surface of the first diffuser element and used for light diffusion.

In the aspect of the present invention, a diffusion angle of said first diffuser element is preferably less than or equal to an angle asin(NA), the NA is a numerical aperture of a lens unit of said projector optical system.

EFFECT OF THE INVENTION

According to the extremely simplified configuration of the optical system of the image projector of the present invention wherein the reflector element being mounted in the optical system vibrates, reduction of speckle noise generation is achieved.

BRIEF DESCRIPTION OF DRAWINGS

FIG. 1A is a schematic diagram of configuration of an image projector according to first embodiment;

FIG. 1B is a schematic diagram of configuration of a modification of the image projector according to first embodiment;

EXPLANATIONS OF LETTERS OR NUMERALS

Figure 2:
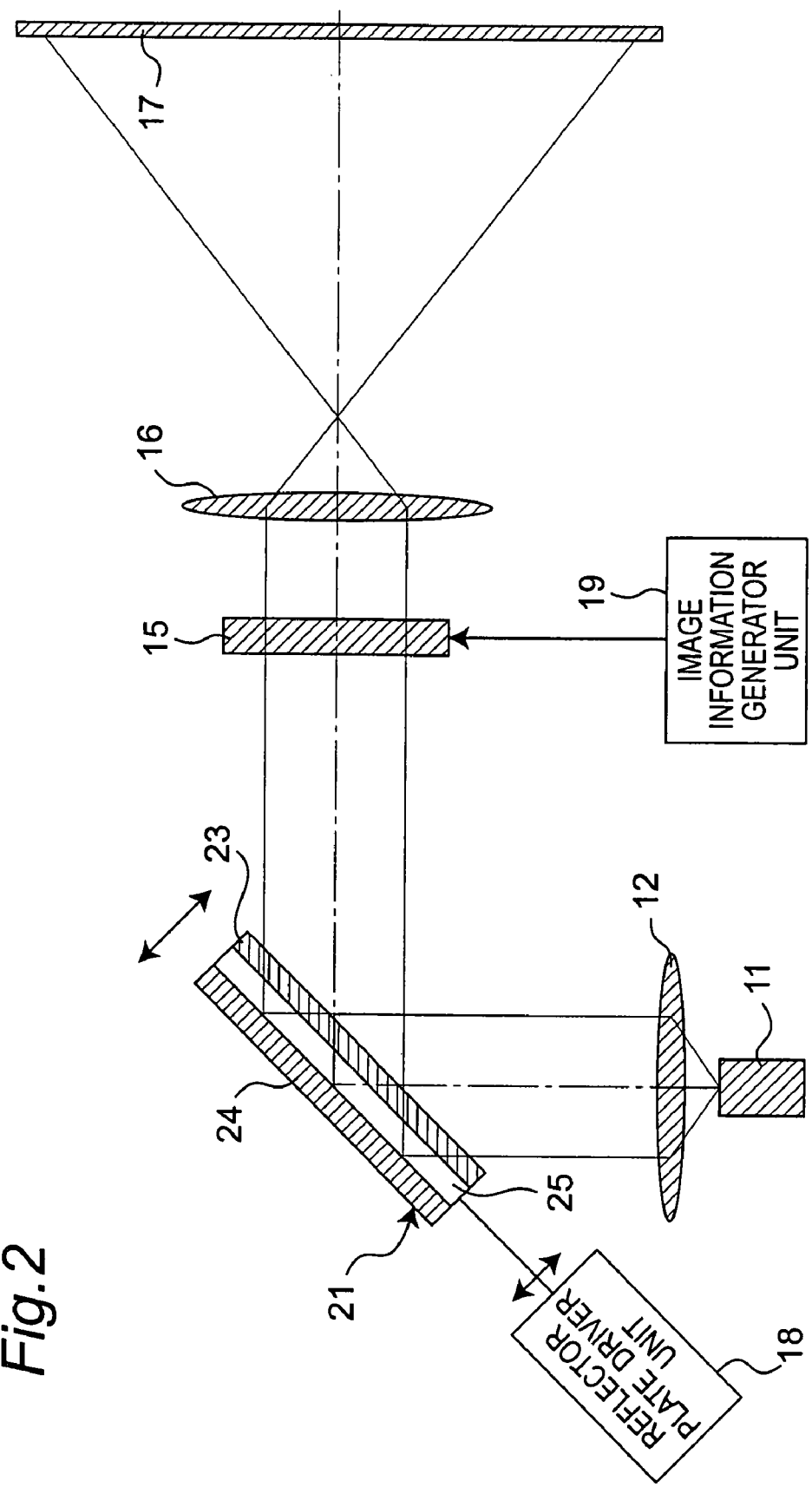
FIG. 2 is a schematic diagram of configuration of an image projector according to second embodiment.

11: semiconductor laser
12: collimator lens
13$a$, 13$b$, 23, 53: diffuser element
14, 24: reflector plate
15: transmissive liquid crystal spatial modulator element
16: projector lens
17: screen
18: reflector plate driver unit
19: image information generator unit
34: diffusive reflector plate
44: rotatable reflector plate
48: reflector plate rotating driver unit

BEST MODE FOR CARRYING OUT THE INVENTION

With Reference to the drawings attached, embodiments of the present invention are described hereinafter.

Embodiment 1

FIG. 1A is a schematic diagram of an image projector according to first embodiment.

The image projector of the present embodiment includes a semiconductor laser 11 as a laser light source (a coherent light source). The image projector includes in order along a optical path of laser light output from the semiconductor laser 11: a collimator lens 12 which transforms divergent light to collimated light; a diffuser element 13; a reflector plate 14 as a reflector element; a transmissive liquid crystal spatial modulator element 15 as a spatial modulator element; a projector lens 16 of a projector optical system; and, a screen 17. In addition, the image projector includes a reflector plate driver unit 18 as reflector element driver means and an image information generator unit 19 as image information generator means. The dashed-dotted line represents a optical axis of the laser light output from the semiconductor laser 11. The elements depicted by dashed lines illustrate: one displaced position of the reflector plate 14; and virtual images of elements which are formed by the displacement of the reflector plate 14 and reflex action of the reflector plate 14, that is, apparent positions of the elements.

The reflector plate 14 can be moved in a reciprocatory vibrating motion in a normal direction to the principal surface (plane) as well as reflect incident light, and is connected to a reflector plate driver unit. The reflector plate driver unit drives the reflector plate so as to move the reflector plate in the reciprocatory vibrating motion.

The image information generator unit 19 is connected to the transmissive liquid crystal spatial modulator element 15 and is capable of sending an input signal which corresponds to image information to the transmissive liquid crystal spatial modulator element 15.

The semiconductor laser 11 radiates divergent laser light. The divergent laser light enters the collimator lens 12 and is substantially transformed to collimated light and outputs therefrom. The collimated laser light is transmitted through a first diffuser element 13$a$ and then changes its direction of travel by almost right angle at the reflector plate 14 which is arranged such that the reflector plate 14 may form an angle of almost 45 degrees with the optical axis. After that, the laser light enters the transmissive liquid crystal spatial modulator element 15. The transmissive liquid crystal spatial modulator element 15 has a liquid crystal pixel and the liquid crystal pixel is capable of changing its transmissivity according to the input signal corresponding to the image information to be projected onto the screen 17. The collimated laser light being modulated by the transmissive liquid crystal spatial modulator element 15 enters the projector lens 16 and reaches the screen 17. The laser light of which contrast is modulated spatially so as to correspond with the image information forms an image on the screen 17.

In the image projector according to the first embodiment, the reflector plate 14 is placed on the optical path of the laser light between the first diffuser element 13$a$ and the transmissive liquid crystal spatial modulator element 15 such that the principal surface of the reflector plate 14 forms an angle of almost 45 degrees with the optical axis of the laser light. Hence, for the sake of the reflex action of the reflector plate 14, it is equivalently conceivable from the optical point of view that the semiconductor laser 11 may be placed at a position of a virtual semiconductor laser 11$va$ on a virtual optical axis which is parallel to the downstream sector of the optical axis from the reflector plate 14.

The reflector plate driver unit 18 is capable of vibrating the reflector plate 14 such that the reflector plate 14 may reciprocate within a range of a predetermined amplitude in more than or equal to several tens of hertz such as in more than or equal to 30 hertz in a direction parallel to the normal of the reflector surface which is one of the principal surfaces of the reflector plate 14. If the reflector plate 14 is in the vibrational reciprocatory motion in the normal direction, the virtual position of the semiconductor laser also displaces. The virtual position of the semiconductor laser displaces cyclically and synchronously to the frequency of the reflector plate 14 in a direction which forms an angle of 45 degrees with the virtual optical axis. The virtual semiconductor laser 11vb is one example of virtual displacement due to the vibration of the reflector plate 14. According to the vibration of the reflector plate 14, the optical path length from the semiconductor laser 11 to the screen 17 varies cyclically and synchronously to the vibration of the reflector plate 14. Accordingly, a relative phase (optical path length) of the laser light which reaches an arbitrary point of the transmissive liquid crystal spatial modulator element 15 and an arbitrary point of the screen 17 varies cyclically and synchronously to the vibration cycle (or vibration frequency) of the reflector plate 14. The reflector plate 14 which vibrates in more than or equal to several tens of hertz varies the distribution of the speckle noise of the screen 17 in a frequency of the several tens of hertz likewise. Therefore, when a person (a viewer) watches the screen 17, the speckle noise changes its position faster than the response time of visual perception of a human being. As a consequence, the speckle noise on any points of the screen is averaged temporally and hence viewer perceptible speckles of intensity and the like are reduced so that the quality of the projected image is improved.

In the present embodiment, the semiconductor laser 11 is a red color semiconductor laser (wavelength of approximately 650 nm) which includes an active layer of AlGaInP series. The collimator lens 12 includes a lens of 0.5 NA (numerical aperture) and the projector lens 16 includes a lens of 0.4 NA.

Figure 5:
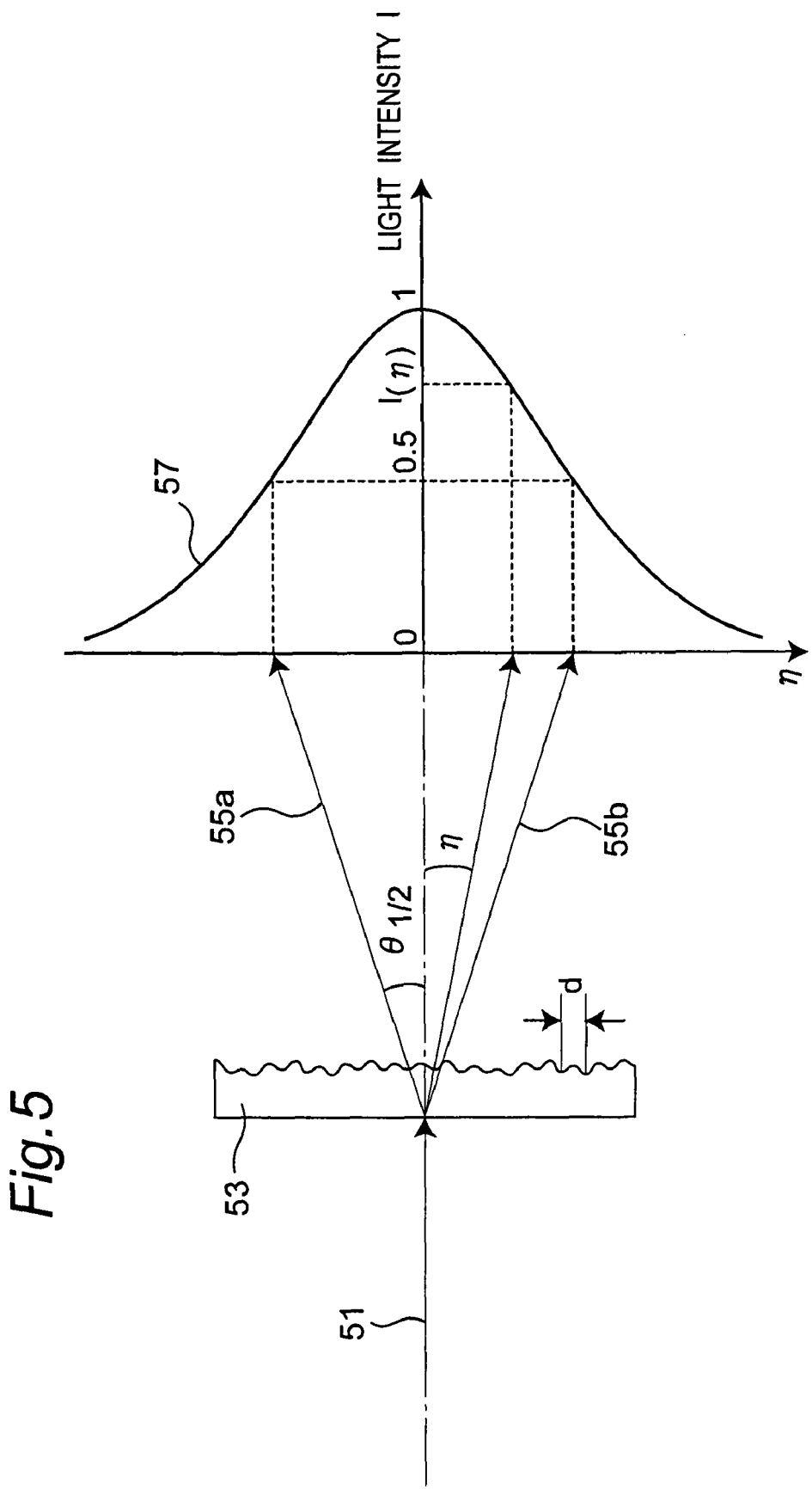
FIG. 5 is a diagram showing a surface profile of a diffuser element and an intensity distribution of diffused light.

FIG. 5 is a schematic diagram for giving an explanation of a surface profile of the first diffuser element 13a and intensity distribution of the light diffused by the first diffuser element 13a. The first diffuser element 13a includes a substrate which is transparent to the laser light output from the semiconductor laser 11. Referring to FIG. 5, at least one principal surface of surfaces of the first diffuser element 13a is processed a surface treatment such that the surface may contain a randomly corrugated surface. The principal surface of the first diffuser element 13a forms a corrugated surface which includes a variety of dimensions of concavity and convexity. As depicted in FIG. 5, the maximum period (the longest distance from one concavity to a next concavity or from one convexity to a next convexity of the concavity and convexity along the surface) is designated as d. Generally, the maximum period d is an amount in the order of several microns.

In addition, the averaged period of the concavity and convexity of the first diffuser element 13a (the averaged distance from one concavity to a next concavity or from one convexity to a next convexity of the concavity and convexity along the surface) is 3.3 microns.

The light 51 which enters the first diffuser element 13a is diffused by the first diffuser element 13a. The intensity distribution 57 shows intensity distribution within the section which is perpendicular to the optical axis of the downstream of the direction of travel of the light 51 from the first diffuser element 13a. Here, eta is an angle included by the optical axis and the line joining the point of intersection of the first diffuser element 13a with the optical axis and a point within the section.

Generally, the intensity of light diffused by a diffuser element shows a monotonically decaying distribution depending on a deviation from an optical axis. The angle eta where the intensity I(eta) equals to 0.5 when the intensity of the diffused light 51 on the optical axis I(0) is normalized to 1 is designated as $theta_{1/2}$ and we call it a diffusion angle. The first diffuser element 13a is a diffuser element having a diffusion angle of 10 degrees.

Referring to FIG. 1A again, the reflector plate 14 vibrates within the vibration range of 100 microns. By virtue of the vibration of the diffuser plate 14, the virtual light sources 11va and 11vb vibrate in the direction forming an angle of almost 45 degrees with the optical axis. In the case of the vibration range being 100 microns, for example, most of the laser light incident to an arbitrary point in the transmissive liquid crystal spatial modulator element 15 is the laser light output from the area of which width is 100/(square root of 2) microns in the diffuser surface of the first diffuser element 13a. Accordingly, the vibration range of the reflector plate 14 is preferably more than or equal to (square root of 2)×d to attain the object of the present invention thoroughly. In the case of the maximum period d being 3.5 microns, the vibration range may be more than or equal to approximately 5 microns. The reason why is that the reciprocatory vibration of the reflector plate 14 with the vibration range being more than or equal to (square root of 2)×d lets the light output from at least two different periods of the concavity and convexity of the surface of the first diffuser element 13a reaches an arbitrary point on the transmissive liquid crystal spatial modulator element 15 and screen 17 during one cycle of the reciprocatory vibrating motion and so the stationary speckle of intensity at the point is prevented.

In addition, the diffusion angle of the first diffuser element 13a is preferably less than or equal to the admissible divergence angle, which the projector lens permits. Basically, the diffusion angle is preferably less than or equal to asin(NA). The NA of the projector lens of the present embodiment placed at the downstream from the first diffuser element 13a is 0.4. Hence most of the diffused light is applied for the projection since the diffusion angle of the first diffuser element 13a of the present embodiment is 10 degrees.

Modification of First Embodiment

FIG. 1B is a schematic diagram of an image projector according to a modification of the first embodiment.

Similarly to the image projector of the first embodiment shown in FIG. 1A, the image projector of the present modification includes: a semiconductor laser 11; a collimator lens 12; a first diffuser element 13a; a reflector plate 14; a transmissive liquid crystal spatial modulator element 15; a projector lens 16; a screen 17; a reflector plate driver unit 18; and, an image information generator unit 19. In addition, this image projector includes a second diffuser element 13b on the optical path between the reflector plate 14 and the transmissive liquid crystal spatial modulator element 15.

Laser light from the semiconductor laser 11 enters the collimator lens 12 and is transmitted through the first diffuser element 13a, and then changes its direction of travel by almost right angle at the reflector plate 14 which is arranged such that the reflector plate 14 may form an angle of almost 45 degrees with the optical axis. After that, the laser light is further transmitted through the second diffuser element 13b and enters the transmissive liquid crystal spatial modulator element 15.

In the present modification, the first diffuser element 13a is a similar element to that of the first embodiment. The second diffuser element 13b may be similar element to the first diffuser element 13a.

As in the case of the first embodiment, the object of the present invention is attained thoroughly by the reflector plate 14 which does the reciprocatory vibrating motion with the vibration range being more than or equal to (square root of 2)×d. Furthermore, the light reflected on the reflector plate 14 is further diffused again by the second diffuser element 13b.

At any point of the second diffuser element 13b, the light entering the point of the second diffuser element 13b is the light coming from different periods of the concavity and convexity of the first diffuser element 13a. Hence, the second diffuser element 13b outputs the light which is further strongly diffused. Accordingly, speckle of intensity of which peak is further diffused and decreased displaces cyclically on the screen 17. Therefore, the intensity of the speckle noise is further decreased and improvement of the projected image is promoted.

A composite diffusion angle of the first and second diffuser elements 13a and 13b is preferably less than the admissible divergence angle, which the projector lens permits. The projector lens 16 of the present embodiment has an NA of 0.4. The composite diffusion angle of the first and second diffuser elements 13a and 13b (the sum of the diffusion angles of the first and second diffuser elements 13a and 13b) is 20 degrees. Accordingly, most of the diffused light is used for the projection.

Second Embodiment

FIG. 2 is a schematic diagram of an image projector according to second embodiment.

Similarly to the image projector of the first embodiment, the image projector according the present embodiment includes: a semiconductor laser 11; a collimator lens 12; a transmissive liquid crystal spatial modulator element 15; a projector lens 16; a screen 17; a reflector plate driver unit 18; and, an image information generator unit 19. In addition, this image projector includes a diffuser element 23 and a reflector plate 24 on the optical path between the collimator lens 12 and the transmissive liquid crystal spatial modulator element 15, both of which are structurally-integrated in a single-piece and functions as a diffuser element as well as a reflector element, and the diffuser element 23 is formed in front of a reflector surface of the reflector plate 24.

The reflector plate 24 and the diffuser element 23 which is integrally formed in front of the reflector surface of the reflector element 24 are arranged such that they may form an angle of almost 45 degrees with the optical axis. The reflector plate and diffuser element 23 are capable of doing reciprocatory vibrating motion in a direction to the normal of the principal surface as well as reflecting incident light and are connected to the reflector plate driver unit 18. The reflector plate driver unit 18 is capable of vibrating the reflector plate 24 and diffuser element 23.

Laser light radiated from the semiconductor laser 11 is collimated by the collimator lens 12. The collimated light is substantially parallel light. The parallel laser light is once transmitted through the diffuser element 23, and then its direction of travel is changed almost right angle by the reflector plate 24. Next, the light is transmitted through the diffuser element 23 again. After that, the light enters the transmissive liquid crystal spatial modulator element 15.

Similarly to the first embodiment, in the image projector of the present embodiment, the reflector plate driver unit 18 is capable of moving the reflector plate 24 and diffuser element 23 which is integrally formed in front of the reflector surface of the reflector plate 24 in a reciprocatory vibrating motion in the direction parallel to the normal of the reflector surface which is a principal surface of the reflector plate 14 within a range of the predetermined amplitude in more than or equal to several tens of hertz. Although one diffuser element 23 is employed in the present embodiment, laser light is transmitted through this diffuser element 23 twice. Therefore, the light diffusion effect is effectual equivalent to the case where two diffuser elements are disposed on the optical path. Hence, in the present embodiment, the image projector with further simplified configuration provides a viewer with the projected image with improved image quality.

In the present embodiment, the diffuser element 23 and the reflector element 24 may be similar to those of the first embodiment. Each of elements designated by a reference number being same as that in the first embodiment may be similar to the element in the first embodiment. A filler 25 disposed between the diffuser element 23 and the reflector element 24 may be glass, a resin, a transparent adhesive agent or the like. The filler 25 may be of a material that is optically transparent for the laser light emitted from the semiconductor laser 11. The filler 25 may also include the air.

Also similarly to the first embodiment, the vibration range of the reciprocatory vibrating motion of the reflector plate 24 and diffuser element 23 which is integrally formed in front of the reflector surface of the reflector plate 24 may be more than or equal to (square root of 2)×d. In this embodiment, the diffuser element 23 diffuses the same light twice. Therefore, the diffusion angle is 20 degrees in effect. The diffusion angle of 20 degrees is smaller than the admissible divergence angle corresponding to the NA (=0.4) of the projector lens 16. Therefore most of the diffused light is applied for the projection.

Third Embodiment

Figure 3:
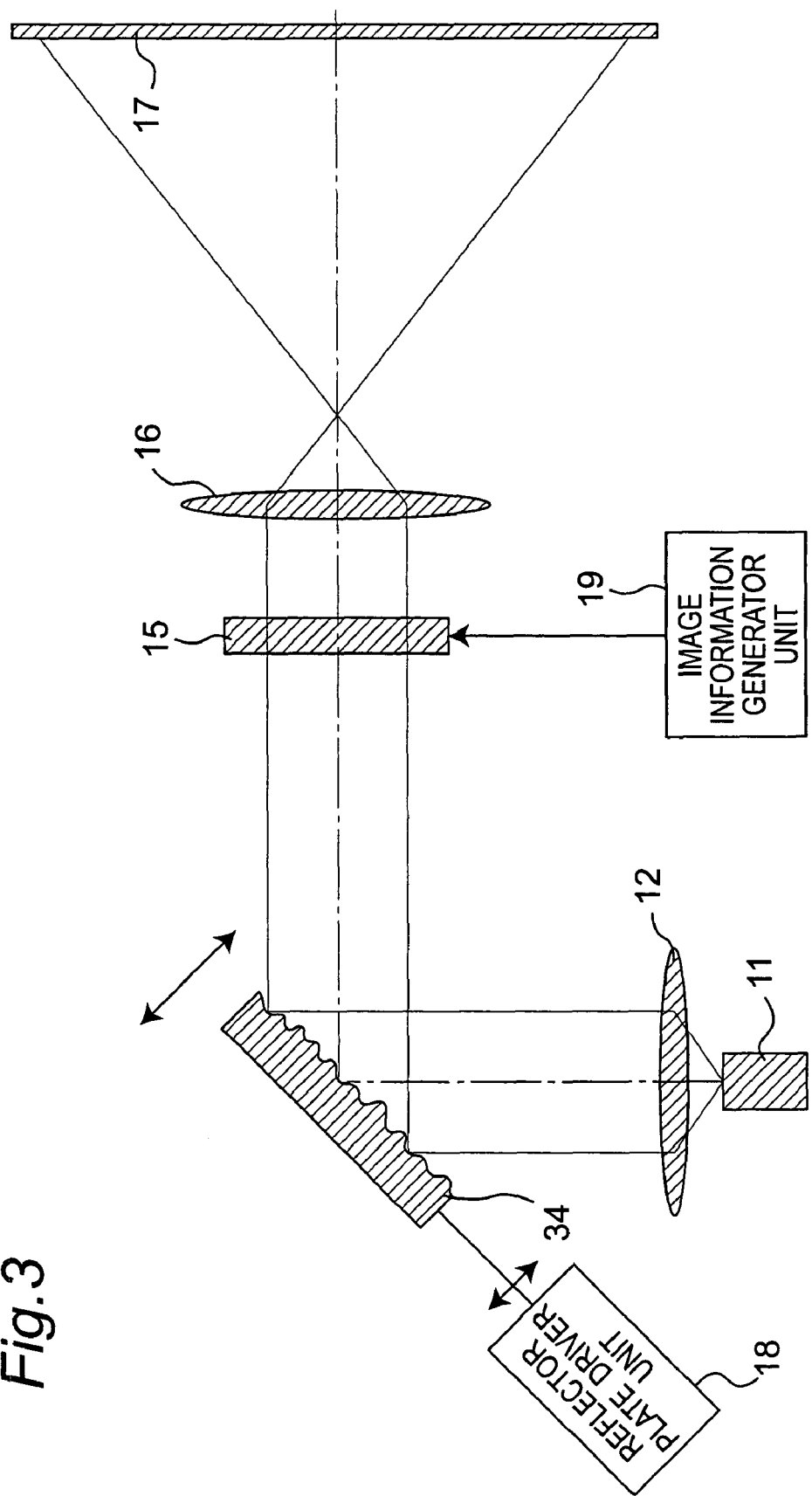
FIG. 3 is a schematic diagram of configuration of an image projector according to third embodiment.

FIG. 3 is a schematic diagram of an image projector according to third embodiment.

The image projector of the present embodiment includes: a semiconductor laser 11; a collimator lens 12; a transmissive liquid crystal spatial modulator element 15; a projector lens 16; a screen 17; a reflector plate driver unit 18; and, an image information generator unit 19, as in the first and second embodiments. Further, the image projector includes a diffusive reflector plate 34 on the optical path between the collimator lens 12 and the transmissive liquid crystal spatial modulator 15.

The diffusive reflector plate 34 is placed such that the principal surface of the diffusive reflector plate 34 forms an angle of almost 45 degrees with the optical axis of the laser light. The diffusive reflector plate 34 is connected to the reflector plate driver unit 18 and capable of reflecting and diffusing incident light, and also of moving in reciprocatory vibrating motion along the normal direction of the principal surface. The reflector plate driver unit 18 can drive the diffusive reflector plate 34 in the reciprocatory vibrating motion.

Laser light radiated from the semiconductor laser 11 is collimated by the collimator lens 12. The collimated light is substantially parallel light. The direction of travel of the parallel laser light is bent with an almost right angle at the diffusive reflector plate 34 having a diffusive surface and diffused thereat and then, the collimated parallel laser light enters the transmissive liquid crystal spatial modulator element 15.

Similarly to the first and second embodiments, in the image projector according to the present embodiment, the reflector plate driver unit 18 is capable of vibrating the diffusive reflector plate 34 such that the diffusive reflector plate 34 may reciprocate within a range of a predetermined amplitude in more than or equal to several tens of hertz such as in more than or equal to 30 hertz in a direction parallel to the normal of the reflector surface which is one of the principal surfaces of the diffusive reflector plate 34. In this embodiment, light diffusion effect being equal to that achieved in the case where a diffuser element is disposed on a optical path is achieved without using the transmissive diffuser element 13a and the like, which are used in aforesaid embodiments. Hence, in the present embodiment, the image projector with further simplified configuration provides a viewer with the projected image with improved image quality.

The diffusive reflector surface of the diffusive reflector element 34 may include a light reflector surface forming the surface profile being similar to that of the concavity and convexity of the diffuser plate shown in FIG. 5. Each of elements designated by a reference number same as that in the first embodiment may be similar to the element in the first embodiment.

Similarly to the first and second embodiments, the vibration range of the reciprocatory vibrating motion of the diffusive reflector element 34 may be more than or equal to (square root of 2)×d. The diffusion angle of the diffusive reflector element 34 is 10 degrees. Most of the diffused light is used for the projection since the diffusion angle of 10 degrees is less than the admissible divergence angle of NA (=0.4) of the projector lens 16.

Fourth Embodiment

Figure 4:
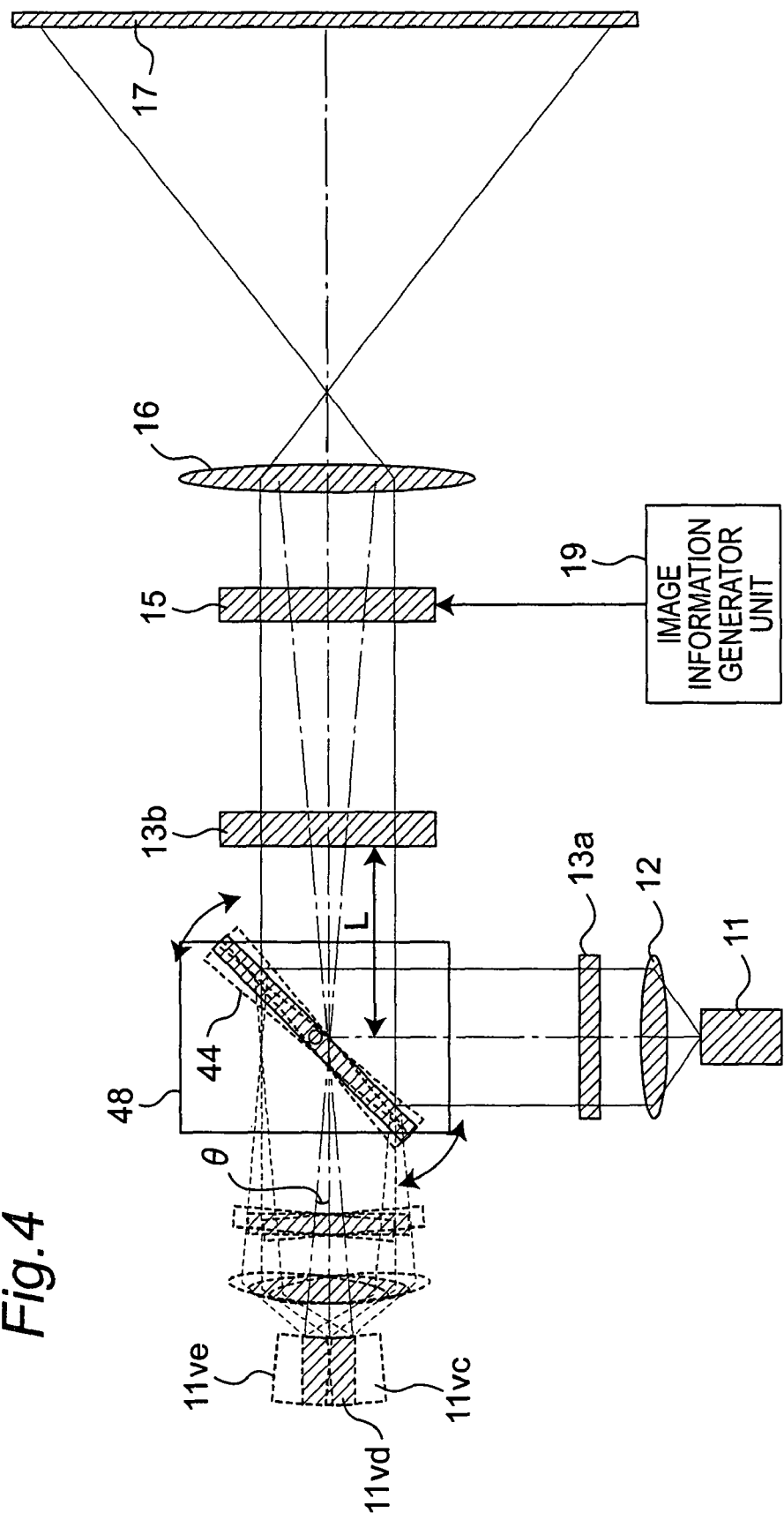
FIG. 4 is a schematic diagram of configuration of an image projector according to fourth embodiment.

FIG. 4 is a schematic diagram of the image projector according to a fourth embodiment.

Similarly to the modification of the first embodiment, the image projector of the present embodiment includes: a semiconductor laser 11; a collimator lens 12; a diffuser element 13a; a second diffuser element 13b; a transmissive liquid crystal spatial modulator element 15; a projector lens 16; a screen 17; and, an image information generator unit 18. In addition, this image projector includes a rotatable reflector plate 44 on the optical path between the first reflector element 13a and the second reflector element 13b.

The rotatable reflector plate 44 can be moved in a rotational swinging motion from the center position of the motion at which the angle formed between the optical axis and its principal surface is 45 degrees with an axis as the central axis of the rotation which is an intersection point with the optical axis and extends along the direction perpendicular to the Figure. The rotatable reflector plate 44 is connected to a reflector plate rotating driver unit 48 at the central axis of the rotation. The reflector plate rotating driver unit 48 can make the rotatable reflector plate 44 a rotational vibrating motion.

The rotatable reflector plate 44 can be rotated within predetermined maximum rotation angle by the reflector plate rotating driver unit 48 with the situation where its principal surface forms an angle of 45 degrees with the optical axis as the center in more than or equal to several tens of hertz such as in 30 hertz. The maximum rotation angle stands for an absolute value of a difference between a maximum (or a minimum) of the angle between the optical axis and the principal surface, which varies with the rotational vibrating motion, and 45 degrees. In addition, the central axis of the ration preferably agrees substantially with the center of gravity of the rotatable reflector plate 44.

If the rotatable reflector plate 44 does the rotational vibrating motion, the virtual position of the semiconductor laser also displaces. Virtual positions of the semiconductor laser are on the circumference of the circle around the central axis of the rotation. And the virtual position when the reflector surface forms an angle of 45 degrees with the optical axis resides in the middle of those. Virtual positions of the semiconductor laser 11vc and live shows the cases when the rotatable reflector plate 44 is at the position where the rotation angle is the maximum rotation angle. In the Figure, theta equals to the maximum rotation angle. According to the rotational vibration of the rotatable reflector plate 44, the optical axis of the semiconductor laser 11 vibrates synchronously to the rotational vibration of the rotatable reflector plate 44. The optical path from the semiconductor laser 11 to a point on the transmissive liquid crystal spatial modulator element 15 or the screen 17 also varies synchronously to the vibration of the rotatable reflector plate 44. Therefore, relative phase (optical path length) of laser light which arrives at an arbitrary point on the transmissive liquid crystal spatial modulator element 15 or the screen 17 and an incident angle of the laser light to that varies cyclically and synchronously to the vibration cycle (or vibration frequency) of the rotatable reflector plate 44. According to the vibration of the rotatable reflector plate 44 of more than or equal to several tens of hertz, distribution of speckle noise varies in a frequency of more than or equal to several tens of hertz. Therefore, when a person (a viewer) watches the screen 17, the speckle noise changes its position faster than the response time of visual perception of a human being. As a consequence, the speckle noise on any points of the screen is averaged temporally and hence viewer perceptible speckles of intensity and the like are reduced so that the quality of the projected image is improved.

According to the rotational vibration of the rotatable reflector plate 44, virtual light sources 11vc, 11vd, and live vibrates rotationally about the central axis of the rotation as the central point within a range of the maximum rotation angle theta. Accordingly, as to the maximum rotation angle, it is only necessary to satisfy the condition that the product of L and theta is more than or equal to d (L×theta>=d) (theta>=d/L) where L is a distance between the central axis of the rotation and the second diffuser element 13b. The reason why is that the rotational vibration of the rotatable reflector plate 44 with the maximum rotation angle theta being more than or equal to d/L lets the light being output from at least two different periods of the concavity and convexity of the surface concavity and convexity profile of the first diffuser element 13a reaches an arbitrary point on the second diffuser element 13b during one cycle of the rotational vibrating motion and so the effect of the light diffusion is further averaged temporally.

The rotatable reflector plate 44 may be similar to the reflector plate 14. Each of other elements designated by reference number being same as that in the first embodiment may be similar to the element in the first embodiment.

From the condition that theta is more than or equal to d/L it is obvious that the maximum rotation angle theta may be quite small. For example, when L=10 mm and d=3.3 micron, the d/L is 0.00033 [rad], namely, 0.019 [deg] and, hence, the theta only have to be more than or equal to 0.019 [deg]. In the present embodiment, the maximum rotation angle is 0.1 degrees. Accordingly, the fluctuation of incident angles to the transmissive liquid crystal spatial modulator element 15 and to the screen 17 is slight.

The composite diffusion angle of the first and second diffuser elements 13a and 13b is 20 degrees. The diffusion angle of 20 degrees is smaller than the admissible divergence angle of NA (=0.4) of the projector lens 16. Therefore most of the diffused light is used for the projection.

However, in the aforesaid embodiments, projector type information display apparatuses using a monochromatic (red color) light source are illustrated, it is possible to provide a color display by disposing an optical system and a spatial modulator element compatible with three colors of red, green, and blue and combining the images of each color on a screen.

In addition, a transmissive liquid crystal of intensity-modulator type is used as a spatial modulator element, but this invention is not limited to the spatial modulator element of transmissive and/or intensity-modulator type. It is also possible to employ a reflective liquid crystal, a reflection-type spatial modulator element being produced by means of micromachine technology, or a spatial modulator element using diffracted light.

INDUSTRIAL APPLICABILITY

The image projector of the present invention enables a reduction of speckle noise using significantly simplified configuration. In addition, the present invention provides visual display. Hence the present invention has elevated industrial applicability.

The invention claimed is:

1. An image projector, comprising:
a coherent light source;
a collimator lens that collimates coherent light from said coherent light source to form collimated coherent light;
a projector optical system that projects the collimated coherent light;
a reflector element that reflects the collimated coherent light and is capable of vibrating in parallel with a direction normal to a reflector surface of said reflector element; and
a reflector element driver unit that drives said reflector element in vibrating motion;
wherein said reflector element driver unit drives said reflector element in reciprocatory vibrating motion in a normal direction of a principal surface of said reflector element; and
wherein a vibration range of said reflector element is more than or equal to square root of 2 times of a maximum period of concavity and convexity profile which is formed on a surface of said first diffuser element and used for light diffusion.

2. An image projector, comprising:
a coherent light source;
a collimator lens that collimates coherent light from said coherent light source to form collimated coherent light;
a projector optical system that projects the collimated coherent light;
a reflector element that reflects the collimated coherent light and is capable of vibrating in parallel with a direction normal to a reflector surface of said reflector element;
a reflector element driver unit that drives said reflector element in vibrating motion; and
a first diffuser element that diffuses the collimated coherent light, said first diffuser element being disposed on an optical path of the collimated coherent light between said collimator lens and said reflector element;
wherein a diffusion angle of said first diffuser element is less than or equal to an angle arcsin of NA, the NA being a numerical aperture of a lens unit of said projector optical system.

* * * * *